Patented Oct. 3, 1944

2,359,363

UNITED STATES PATENT OFFICE 2,359,363

PREPARATION OF SULPHONYL GUANIDINES

Donald W. Kaiser, Riverside, Conn., assignor to American Cyanamid Company, New York, N. Y., a corporation of Maine No Drawing. Application April 11, 1942, Serial No. 438,571

9 Claims. (Cl. 260—397.7)

This invention relates to a method for preparing sulphonyl guanidines. More particularly it relates to a method of preparing sulphonyl guanidines by a method employing a sulphonyl guanylurea or sulphonyl dicyandiamide as an intermediate.

In the past a number of sulphonyl guanidine compounds have been prepared by the reaction of various sulphonyl halides with guanidine. In one of these prior art processes the important chemotherapeutic agent, sulphanilylguanidine, was produced. I have found that sulphonyl guanidines, including sulphanilylguanidine, can be prepared by an entirely different process utilizing as intermediates sulphonyl dicyandiamides or sulphonyl guanylureas.

According to the present invention an aliphatic or aromatic sulphonyl dicyandiamide is subjected to hydrolysis in the presence of water or an aqueous acid solution to yield the corresponding sulphonyl guanylurea which upon subsequent treatment with an alkaline reagent yields the corresponding guanidines. The production of sulphonyl guanylureas by hydrolyzing sulphonyl dicyandiamides is claimed in the co-pending application of Donald W. Kaiser and Jack T. Thurston, Serial No. 438,572, filed April 11, 1942. The aliphatic or aromatic sulphonyl guanylureas may be used as the initial starting material in my process and they may be prepared by other methods, such as for example reacting a sulfonyl halide with guanylurea, and the present invention is not necessarily dependent upon any particular method for their production. The aliphatic or aromatic sulphonyl dicyandiamides may be prepared in accordance with the process described in the co-pending application of Donald W. Kaiser and Jack T. Thurston, application Serial No. 438,573, filed April 11, 1942.

I have found that aliphatic or aromatic sulphonyl guanylureas upon treatment with alkaline reagents yield the corresponding sulphonyl guanidines in excellent yields and that the process is particularly well suited for the production of sulphanilylguanidine utilizing p-acetylaminobenzenesulphonyl dicyandiamide or p-acetylaminobenzenesulphonyl guanylurea as the starting material.

The invention will be described in greater detail in conjunction with the following specific examples which are typical illustrations, but it should be understood that the invention is not limited to the exact details set forth therein.

EXAMPLE 1

*Benzenesulphonyl guanidine*

A solution of 22.4 g. of benzenesulphonyl dicyandiamide in aqueous 50% ethyl ether of ethylene glycol was refluxed for three hours. After cooling slightly 4.22 g. 95% sodium hydroxide was added and refluxing continued for fifteen minutes. Ammonia was evolved during this time. The solution was filtered and on cooling 10.2 g. or a 51.3% yield of benzenesulphonyl guanidine, decomposing at 200°–203° C was obtained. Acidification of the filtrate evolved $CO_2$. Crystallization of the product from hot water gave glittering needles decomposing at 210°–211° C.

EXAMPLE 2

*n-Butylsulphonyl guanidine*

A solution of 13.3 g. of n-butylsulphonyl guanylurea in 20 g. of water which contained 2.53 g. of 95% sodium hydroxide was refluxed for thirty minutes. Ammonia began to be evolved after five to ten minutes of heating. The solution was treated with decolorizing charcoal, filtered and allowed to cool. The colorless solid was filtered, washed with water, and air-dried. The dried solid decomposed at 155°–157° C. and weighed 8.5 g., which represents a 79% yield. Crystallization from hot water gave long, colorless needles decomposing at 157°–158° C.

EXAMPLE 3

*Benzenesulphonyl guanidine*

After heating to reflux a mixture of 12.1 g. of benzenesulphonyl guanylurea, 100 cc. of water, and 2.1 g. of 95% sodium hydroxide, solution occurred. Within five minutes almost a solid cake had formed and ammonia was strongly evolved. Another 100 cc. of water was added but solution did not occur so heating was discontinued, the mixture was cooled, and the solid filtered. The nearly colorless needles weighed 8.0 g. after drying and decomposed at 204°–206° C. A mixed melting point with dicyandiamide gave a marked depression in the decomposition temperature. Acidification of the filtrate gave 1.6 g. of starting material which decomposed at 239°–241° C.

The alkali insoluble material was crystallized from hot water which contained a small amount of the ethyl ether of ethylene glycol. Beautiful needles decomposing at 208° C.–209° C. were obtained which after recrystallization decomposed at 211°–212° C. The yield after deduction of the recovered starting material was 92.5%.

Example 4

Sulphanilyl guanidine

To a solution of 1.15 g. of 95% sodium hydroxide in 30 cc. of water was added 7.0 g. of crude sulphanilyl guanylurea. After heating to reflux a light yellow solution resulted and about seven minutes later the odor of ammonia was pronounced. Refluxing was continued for a total of thirty minutes. A little activated charcoal was added, the solution filtered, and allowed to cool. The almost solid cake of nearly colorless crystals was broken up, the solid filtered, washed with water, and allowed to dry. The crude product weighed 4.4 g. which represented a yield of 75.5%, and the material decomposed at 171°–174° C. Recrystallization from hot water gave beautiful colorless plates which decomposed at 185°–186° C.

Example 5

Benzenesulphonyl guanidine

A mixture containing 24.2 g. of benzenesulphonyl guanylurea, 11.0 g. of n-butylamine, and 500 g. of water was refluxed for two hours. After fifteen minutes complete solution had occurred. The solution was treated with activated charcoal, filtered hot, and on cooling 18.0 g. or a 90.5% yield of benzenesulphonyl guanidine was obtained. The colorless crystals decomposed at 204°–206° C. and a fusion with a known sample whose decomposition point was 211°–212° C. melted with decomposition at 206°–211° C.

In a similar experiment sulphanilyl guanylurea was converted into sulphanilylguanidine.

Example 6

Benzenesulphonyl guanidine

To 24.2 g. of benzenesulphonyl guanylurea was added 8.0 g. of anhydrous sodium carbonate, 500 g. of water. The mixture was refluxed for two hours, during which time ammonia was slowly evolved. Activated charcoal was added to the slightly turbid solution and after filtration, colorless plates separated. The product was collected on a filter, washed with a small quantity of water and dried, and a 90.5% yield of benzenesulphonyl guanidine was obtained. The product decomposed at 204°–206° C. and gave no depression when fused with an authentic sample of benzenesulphonyl guanidine.

In a similar experiment sulphanilylguanylurea was converted into sulphanilylguanidine.

In the foregoing examples the specific sulphonyl dicyandiamides employed as starting materials may be replaced by other sulphonyl dicyandiamides including the primary aliphatic sulphonyl dicyandiamide, ethylsulphonyl dicyandiamide, hexylsulphonly dicyandiamide, decylsulphonyl dicyandiamide, dodecylsulphonyl dicyandiamide, hexadecylsulphonyl dicyandiamide, octadecylsulphonyl dicyandiamide, 2-ethylhexylsulphonyl dicyandiamide, etc.; the secondary aliphatic sulphonyl dicyandiamides, isopropylsulphonyl dicyandiamide, a secondary butylsulphonyl dicyandiamide, secondary amylsulphonyl dicyandiamide, etc.; and the tertiary sulphonyl dicyandiamides, tertiary butylsulphonyl dicyandiamide, tertiary amylsulphonyl dicyandiamide, α,α-dimethylhexylsulphonyl dicyandiamide; the alicyclic sulphonyl dicyandiamides, cyclohexylsulphonyl dicyandiamide, cyclopentylsulphonyl dicyandiamide, cyclohexylmethylsulphonyl dicyandiamide, β-cyclohexylethylsulphonyl dicyandiamide, α-cyclohexylpropylsulphonyl dicyandiamide, and those alicyclic compounds derived from petroleum. Among the aromatic sulphonyl dicyandiamides may be included those such as p-toluenesulphonyl dicyandiamide, p-carboxybenzenesulphonyl dicyandiamide, m-nitrobenzenesulphonyl dicyandiamide, o-brombenzenesulphonyl dicyandiamide, p-methoxybenzenesulphonyl dicyandiamide, α-naphthalenesulphonyl dicyandiamide, β-naphthalenesulphonyl dicyandiamide, α - 5 - sulphonaphthalenesulphonyl dicyandiamide, etc.

Similarly, the sulphonyl guanylureas employed in the specific examples may be replaced by other sulphonyl guanylureas including the primary aliphatic sulphonyl guanylureas, ethylsulphonyl guanylurea, hexylsulphonyl guanylurea, decylsulphonyl guanylurea, dodecylsulphonyl guanylurea, hexadecylsulphonyl guanylurea, octadecylsulphonyl guanylurea, 2 - ethylhexylsulphonyl guanylurea, etc.; the secondary aliphatic sulphonyl guanylureas, isopropylsulphonyl guanylurea, secondary butylsulphonyl guanylurea, secondary amylsulphonyl guanylurea, etc.; and the tertiary sulphonyl guanylureas, tertiary butylsulphonyl guanylurea, tertiary amylsulphonyl guanylurea, α,α-dimethylhexylsulphonyl guanylurea, the alicyclic sulphonyl sulphonyl guanylurea, cyclohexylsulphonyl guanylurea, cyclopentylsulphonyl guanylurea, cyclohexylmethylsulphonyl guanylurea, β-cyclohexylethylsulphonyl guanylurea, α - cyclohexylpropylsulphonyl guanylurea, and those alicyclic compounds derived from petroleum. Among the aromatic sulphonyl guanylureas may be included those such as p-toluenesulphonyl guanylurea, p-carboxybenzenesulphonyl guanylurea, m - nitrobenzenesulphonylguanylurea, o - brombenzenesulphonyl guanylurea, p-methoxybenzenesulphonyl guanylurea, α-naphthalene sulphonyl guanylurea, β-naphthalenesulphonyl guanylurea, α-sulphonaphthalenesulphonyl guanylurea, etc.

The specific alkaline reagents employed in the examples may be replaced by other suitable basic reacting substances. In general I have found that any basic substance which is more basic in reaction than guanylurea may be used in my process for converting sulphonyl guanylureas to the corresponding sulphonyl guanidines. The basic substances that can be employed include those such as ammonia bases, as for example ammonia, hydroxylamines, hydrazines, guanidines, aliphatic, hydroaromatic or aromatic primary or secondary amines or polyamines. Specific examples of such bases are ammonia, methyl, ethyl, propyl, butyl, amyl, decyl, dodecyl, octadecyl and cyclohexyl amines, aniline, mono-methyl, -ethyl, -propyl or -butyl anilines, hydroxylamine, N- and O-alkyl, -cycloalkyl or -aryl hydroxylamines, hydrazine and N-alkyl, cycloalkyl or aryl hydrazines, di-ethylene triamine, tri-ethylene tetramine and similar polyamines.

The organic bases of the quaternary ammonium type are also satisfactory and include those such as tetramethylammonium hydroxide, tetraethylammonium hydroxide, benzyltrimethylammonium hydroxide, methallyltriethylammonium hydroxide, allyldimethylphenylammonium hydroxide, benzyldiethylphenylammonium hydroxide, isopropyl-triallylammonium hydroxide and the like.

Of particular interest as basic substances for carrying out my process may be included the alkali metal and alkaline earth metal bicarbonates, carbonates, and hydroxides. The quantities of alkaline reagents may be varied considerably from those illustrated and the conditions of carrying out the reactions may also be varied. For example, in the specific illustrations approximately molecular equivalents of the basic substances were employed. It is not necessary that such large amounts be used and satisfactory results can be obtained using .5 molecular quantities, .1 molecular quantities, or other smaller molecular quantities.

It is obvious that the above description and examples are intended to be illustrative only and that they may be varied or modified to a considerable extent without departing from the spirit of the invention or sacrificing the advantages thereof. We do not, therefore, intend to limit ourselves to the specific embodiments herein set forth except as indicated in the appended claims.

What I claim is:

1. The process of producing sulphonyl guanidines which comprises subjecting a substance of the group consisting of aliphatic sulphonyl guanylureas and aromatic sulphonyl guanylureas to a heat treatment in the presence of water and a basic substance.

2. The process of producing sulphonyl guanidines which comprises subjecting a substance of the group consisting of aliphatic sulphonyl guanylureas and aromatic sulphonyl guanylureas to a heat treatment in the presence of an aqueous solution of an inorganic base.

3. The process of producing sulphonyl guanidines which comprises subjecting a substance of the group consisting of aliphatic sulphonyl guanylureas and aromatic sulphonyl guanylureas to a heat treatment in the presence of an aqueous solution of an ammonia base.

4. A process of producing aliphatic sulphonyl guanidines which comprises subjecting an aliphatic sulphonyl guanylurea to a heat treatment in the presence of water and a basic substance.

5. A process of producing aliphatic sulphonyl guanidines which comprises subjecting an aliphatic sulphonyl guanylurea to a heat treatment in the presence of an aqueous solution of an inorganic base.

6. A process of producing aromatic sulphonyl guanidines which comprises subjecting an aromatic sulphonyl guanylurea to a heat treatment in the presence of water and a basic substance.

7. A process of producing aromatic sulphonyl guanidines which comprises subjecting an aromatic sulphonyl guanylurea to a heat treatment in the presence of an aqueous solution of an inorganic base.

8. A method for producing n-butylsulphonyl guanidine which comprises subjecting n-butylsulphonyl guanylurea to a heat treatment in the presence of an aqueous alkali metal base.

9. The process of producing a sulphanilylguanidine which comprises subjecting p-acetylaminobenzenesulphonyl guanylurea to a heat treatment in the presence of an aqueous solution of an alkali metal base.

DONALD W. KAISER.